(12) United States Patent
Miyazaki (10) Patent No.: US 8,697,296 B2
(45) Date of Patent: Apr. 15, 2014

(54) FUEL CELL SYSTEM AND METHOD OF STARTING OPERATION OF THE FUEL CELL SYSTEM

(75) Inventor: Tomio Miyazaki, Hadano (JP)

(73) Assignee: Honda Motor Co., Ltd., Tokyo (JP)

( * ) Notice: Subject to any disclaimer, the term of this patent is extended or adjusted under 35 U.S.C. 154(b) by 1234 days.

(21) Appl. No.: 12/203,579

(22) Filed: Sep. 3, 2008

(65) Prior Publication Data

US 2009/0061273 A1 Mar. 5, 2009

(30) Foreign Application Priority Data

Sep. 4, 2007 (JP) ................. 2007-228940

(51) Int. Cl.
*H01M 8/00* (2006.01)
*H01M 8/06* (2006.01)

(52) U.S. Cl.
USPC ........... 429/400; 429/403; 429/407; 429/435; 429/458

(58) Field of Classification Search
USPC .................. 429/400, 403, 407, 435, 458
See application file for complete search history.

(56) References Cited

U.S. PATENT DOCUMENTS

| 7,157,169 B2 | 1/2007 | Kushibiki et al. |
| 2005/0136307 A1* | 6/2005 | Tsunoda ......................... 429/26 |

FOREIGN PATENT DOCUMENTS

| JP | 2001-155754 | 6/2001 |
| JP | 2003-132933 | 5/2003 |
| JP | 2004-335161 | 11/2004 |

* cited by examiner

*Primary Examiner* — Lyle Alexander
(74) *Attorney, Agent, or Firm* — Nelson Mullins Riley & Scarborough LLP; Anthony A. Laurentano

(57) ABSTRACT

A separator includes sandwiching sections for sandwiching electrolyte electrode assemblies. A fuel gas channel and an oxygen-containing gas channel are formed in each of the sandwiching sections. Further, the separator includes first bridges connected to the sandwiching sections and a manifold connected to the first bridges. A fuel gas supply channel is formed in the first bridge for supplying the fuel gas to the fuel gas channel. A fuel gas supply passage extends through the manifold in the stacking direction for supplying the fuel gas to the fuel gas supply channel. At the time of starting operation, the heated air is distributed to the oxygen-containing gas channel and the fuel gas channel through a circumferential portion of the electrolyte electrode assembly.

4 Claims, 10 Drawing Sheets

FUEL CELL SYSTEM AND METHOD OF STARTING OPERATION OF THE FUEL CELL SYSTEM

BACKGROUND OF THE INVENTION

1. Field of the Invention

The present invention relates to a fuel cell system including a fuel cell stack formed by stacking electrolyte electrode assemblies and separators. Each of the electrolyte electrode assemblies includes an anode, a cathode, and an electrolyte interposed between the anode and the cathode. Further, the present invention relates to a method of starting operation of such a fuel cell system.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly (MEA). The electrolyte electrode assembly is interposed between separators (bipolar plates). In use, generally, a predetermined number of the MEAs and the separators are stacked together to form a fuel cell stack.

In the solid oxide fuel cell of this type, since the operating temperature is high, at the temperature of several hundred degrees C. (e.g., around 700° C.), it is necessary to rapidly raise the temperature of the fuel cell at the time of starting operation of the fuel cell. For this purpose, Japanese Laid-Open Patent Publication No. 2004-335161 discloses a technique of heating a solid oxide fuel cell. According to the disclosure, fuel oxidizing catalyst is provided in an oxygen-containing gas channel of separators. At the time of preheating the fuel cell before starting operation of the fuel cell, heating means is used to heat power generation cells from the outside. A mixed gas of an oxygen-containing gas and a fuel gas of less than the lower explosive limit is supplied to the oxygen-containing gas channel, and catalyst combustion of the mixed gas is induced by the fuel oxidizing catalyst. By the heat of the catalyst combustion, the power generation cells are heated internally.

Further, in a technique of heating a solid oxide fuel cell disclosed in Japanese Laid-Open Patent Publication No. 2001-155754, a combustor is provided adjacent to an air supply channel, and another combustor is provided adjacent to a fuel gas channel. At the time of starting operation of the fuel cell, by combustion in both of the combustors, the combustion exhaust gas is supplied to the air supply channel and the fuel gas channel for heating the cell area.

Further, Japanese Laid-Open Patent Publication No. 2003-132933 discloses a fuel cell stack including fuel cells in which combustion heater plates are provided between cell plates of the fuel cell stack.

In Japanese Laid-Open Patent Publication No. 2004-335161, the fuel oxidizing catalyst is provided in the oxygen-containing gas channel. By combustion of the mixed gas in the oxygen-containing gas channel, the power generation cells are heated. In the structure, the temperature on the fuel gas channel side is considerably low in comparison with the temperature on the oxygen-containing gas channel side. Thus, because of the presence of such a temperature inhomogeneous distribution in the power generation cell, uniform heating cannot be performed, and the temperature cannot be raised rapidly.

Further, in Japanese Laid-Open Patent Publication No. 2001-155754, the combustors are provided on both sides of the fuel cell, and the temperature of the fuel cell is raised by the combustion gas from the combustors. Therefore, the fuel cell tends to be degraded easily by the combustion exhaust gas. Further, since the two combustors are provided, the overall size of the fuel cell becomes considerably large.

Further, in Japanese Laid-Open Patent Publication No. 2003-132933, the combustion heater plates are provided between the cell plates of the fuel cell stack. Therefore, the number of combustion heater plates becomes larger as the increase in the number of the cells stacked to form the fuel cell stack. Consequently, the overall size of the fuel cell stack in the stacking direction becomes considerably large, and the structure of the fuel cell stack is complicated.

SUMMARY OF THE INVENTION

The present invention has been made to solve the problems of this type, and an object of the present invention is to provide a fuel cell system and a method of starting operation of the fuel cell system in which, with simple and compact structure, it is possible to rapidly raise the temperature of a fuel cell stack to the temperature where power generation can be performed.

The present invention relates to a fuel cell system including a fuel cell stack formed by stacking electrolyte electrode assemblies and separators. Each of the electrolyte electrode assemblies includes an anode, a cathode, and an electrolyte interposed between the anode and the cathode.

The separator includes a sandwiching section, a bridge, and a manifold. The sandwiching section sandwiches the electrolyte electrode assembly, and has a fuel gas channel for supplying a fuel gas along an electrode surface of the anode and an oxygen-containing gas channel for supplying an oxygen-containing gas along an electrode surface of the cathode. The fuel gas and the oxygen-containing gas after consumption are discharged from a circumferential portion of the electrolyte electrode assembly. The bridge is connected to the sandwiching section. A fuel gas supply channel is formed in the bridge for supplying the fuel gas to the fuel gas channel. The manifold is connected to the bridge. A fuel gas supply passage extends through the manifold in the stacking direction for supplying the fuel gas to the fuel gas supply channel.

The fuel cell system further includes a heating mechanism for heating the oxygen-containing gas supplied to the fuel cell stack, and a heating medium supply channel for distributing the heated oxygen-containing gas to the oxygen-containing gas channel and the fuel gas channel through the circumferential portion of the electrolyte electrode assembly.

Further, the present invention relates to a method of starting operation of a fuel cell system including a fuel cell stack formed by stacking electrolyte electrode assemblies and separators. Each of the electrolyte electrode assemblies includes an anode, a cathode, and an electrolyte interposed between the anode and the cathode. The separator includes a sandwiching section, a bridge, and a manifold. The sandwiching section sandwiches the electrolyte electrode assembly, and has a fuel gas channel for supplying a fuel gas along an electrode surface of the anode and an oxygen-containing gas channel for supplying an oxygen-containing gas along an electrode surface of the cathode. The fuel gas and the oxygen-containing gas after consumption are discharged from a circumferential portion of the electrolyte electrode assembly. The bridge is connected to the sandwiching section. A fuel gas supply channel is formed in the bridge for supplying the fuel gas to the fuel gas channel. The manifold is connected to the bridge. A fuel gas supply passage extends through the manifold in the stacking direction for supplying the fuel gas to the fuel gas supply channel.

The method of starting operation includes the steps of heating the oxygen-containing gas, distributing the oxygen-containing gas to the oxygen-containing gas channel and the fuel gas channel through the circumferential portion of the electrolyte electrode assembly, and causing ignition of the fuel gas by supplying the fuel gas to the fuel gas channel.

In the present invention, since the hot oxygen-containing gas is used for heating the cathode and the anode, the cathode and the anode are heated uniformly. Thus, generation of heat stress and heat strain is suppressed.

Further, since the hot oxygen-containing gas is supplied to the fuel gas channel, when the fuel gas is supplied to the fuel gas channel, ignition of the fuel gas occurs. Therefore, the cathode and the anode are directly heated on the separators. By combustion of the fuel gas, the electrolyte electrode assemblies and the separators are rapidly heated to the temperature where power generation can be performed. Accordingly, operation of the fuel cell stack is started suitably.

Still further, complete combustion of the fuel gas occurs on the separators in the hot oxygen-containing gas atmosphere. Therefore, production of CO is prevented. No CO removing apparatus is required economically. Further, since the heated oxygen-containing gas is used, for example, the combustion exhaust gas from a combustor is not required. Accordingly, corrosion of the separators is prevented suitably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
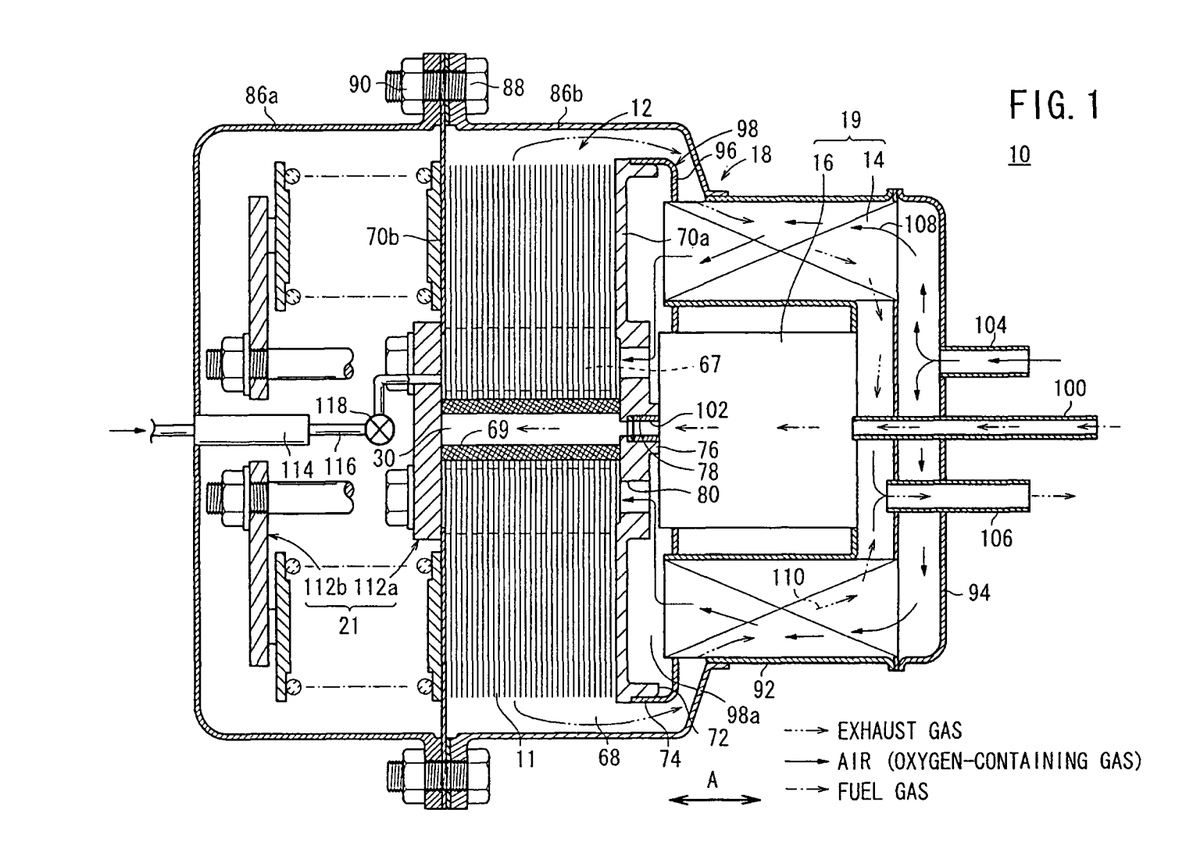
FIG. 1 is a partial cross sectional view showing a fuel cell system including fuel cells according to a first embodiment of the present invention.

A fuel cell system 10 including fuel cells 11 as shown in FIG. 1 is used in various applications, including stationary and mobile applications. For example, the fuel cell system 10 is mounted on a vehicle. As shown in FIG. 1, the fuel cell system 10 includes a fuel cell stack 12, a heat exchanger 14, a reformer 16, and a casing 18. The fuel cell stack 12 is formed by stacking a plurality of the fuel cells 11. The heat exchanger 14 heats an oxygen-containing gas before it is supplied to the fuel cell stack 12. The reformer 16 reforms a fuel to produce a fuel gas. The fuel cell stack 12, the heat exchanger 14, and the reformer 16 are disposed in the casing 18.

In the casing 18, a fluid unit 19 including at least the heat exchanger 14 and the reformer 16 is disposed on one side of the fuel cell stack 12, and a load applying mechanism 21 for applying a tightening load to the fuel cells 11 in the stacking direction indicated by the arrow A is disposed on the other side of the fuel cell stack 12. The fluid unit 19 and the load applying mechanism 21 are provided symmetrically with respect to the central axis of the fuel cell stack 12.

Figure 2:
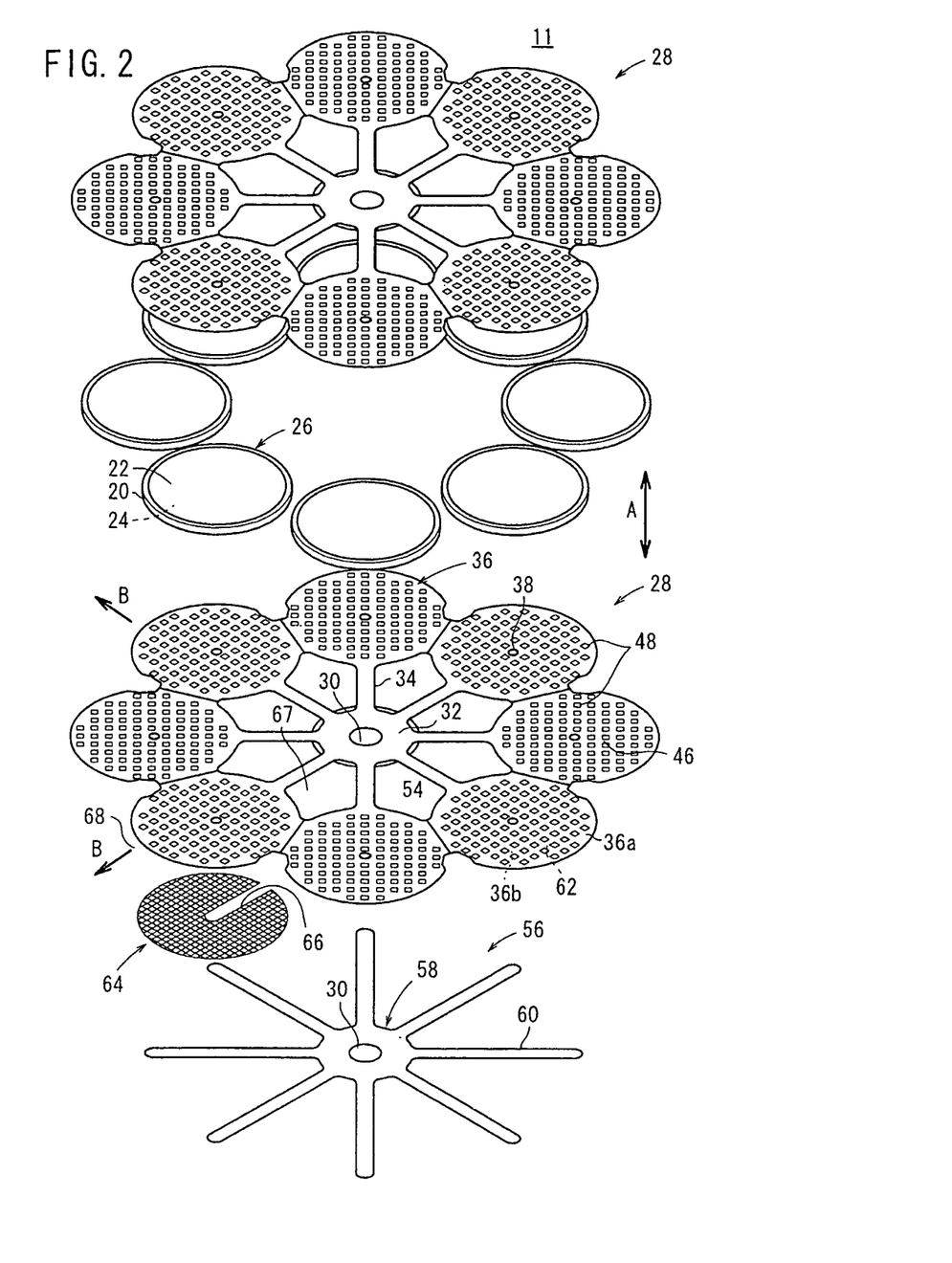
FIG. 2 is an exploded perspective view showing a fuel cell of the fuel cell stack.
Figure 3:
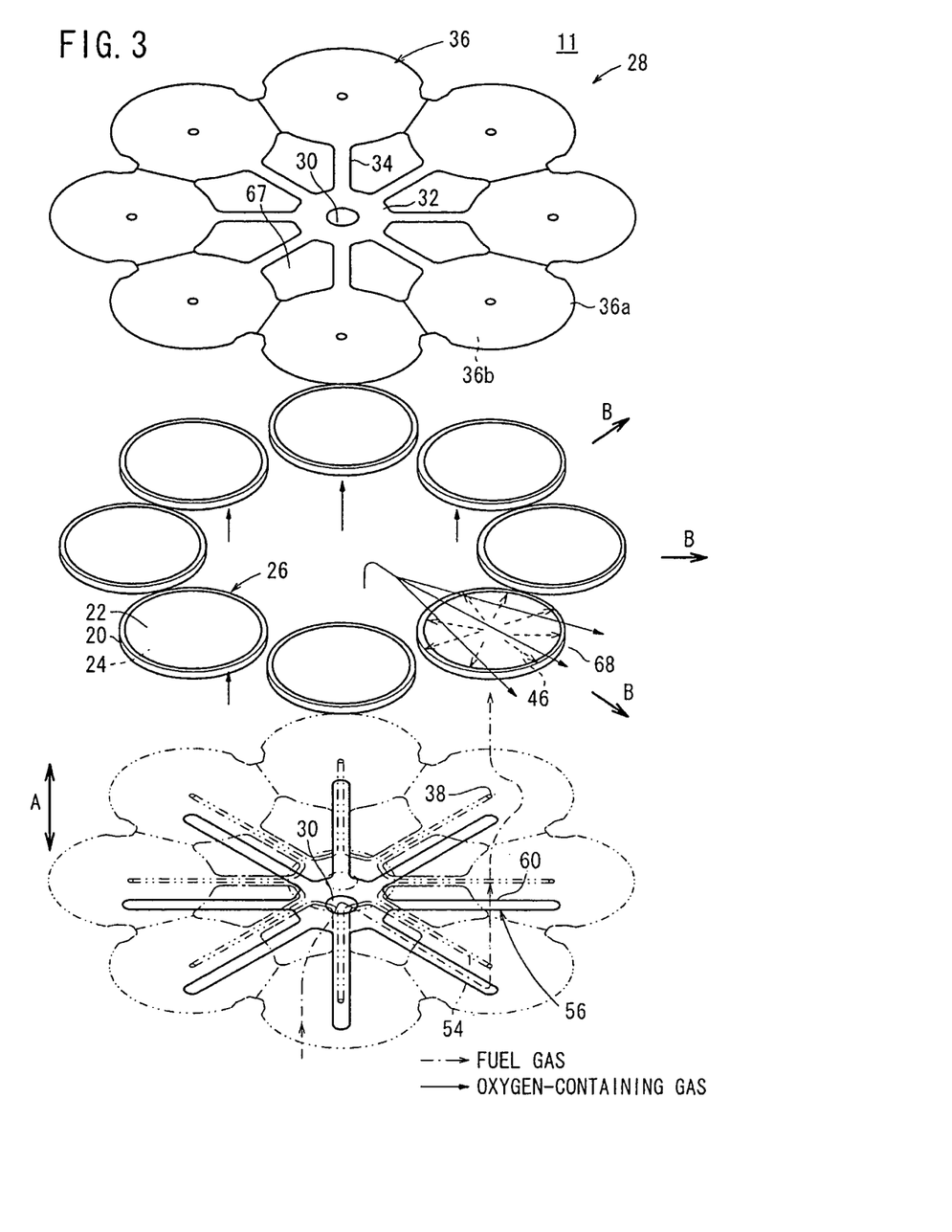
FIG. 3 is a partial exploded perspective view showing gas flows in the fuel cell.

The fuel cell 11 is a solid oxide fuel cell. As shown in FIGS. 2 and 3, the fuel cell 11 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the inner circumferential edge of the electrolyte electrode assembly 26 (central side of the separator 28) for preventing the entry of the oxygen-containing gas.

The anode 24 is made of porous material of Ni, for example. The surface area of the cathode 22 is smaller than the surface area of the anode 24. Alternatively, the surface area of the cathode 22 and the surface area of the anode 24 may be the same.

A plurality of, e.g., eight electrolyte electrode assemblies 26 are sandwiched between a pair of separators 28 to form the fuel cell 11. The eight electrolyte electrode assemblies 26 are concentric with a fuel gas supply passage 30 extending through the center of the separators 28.

In FIG. 2, for example, each of the separators 28 comprises a single metal plate of, e.g., stainless alloy, a carbon plate, or the like. The separator 28 has a manifold 32. The fuel gas supply passage 30 extends through the center of the manifold 32. The manifold 32 is integral with sandwiching sections 36 each having a relatively large diameter through a plurality of first bridges 34. The first bridges 34 extend radially outwardly from the manifold 32 at equal angles (intervals).

The sandwiching section 36 and the electrolyte electrode assembly 26 have substantially the same size. A fuel gas inlet 38 for supplying the fuel gas is formed at the center of the sandwiching section 36, or at an upstream position deviated from the center of the sandwiching section 36 in the flow direction of the oxygen-containing gas.

Each of the sandwiching sections 36 has a plurality of protrusions 48 on its surface 36a which contacts the anode 24. The protrusions 48 form a fuel gas channel 46 for supplying the fuel gas along an electrode surface of the anode 24. For example, the protrusions 48 are solid portions formed by etching on the surface 36a. Various shapes such as a rectangular shape, a circular shape, a triangular shape, or the like can be adopted as the cross sectional shape of the protrusions 48. The positions or the density of the protrusions 48 can be changed arbitrarily depending on the flow state of the fuel gas or the like.

A fuel gas supply channel 54 connecting the fuel gas supply passage 30 to the fuel gas inlet 38 is formed in each of the first bridges 34.

As shown in FIG. 2, a channel member 56 is fixed to a surface of the separator 28 facing the cathodes 22, e.g., by brazing or laser welding or the like. The channel member 56 is a flat plate. A manifold 58 is formed at the center of the channel member 56. The fuel gas supply passage 30 extends through the manifold 58. Eight second bridges 60 extend radially from the manifold 58. Each of the second bridges 60 is fixed to the separator 28, from the first bridge 34 to the surface 36b of the sandwiching section 36, covering the fuel gas inlet 38 (see FIG. 4).

Figure 4:
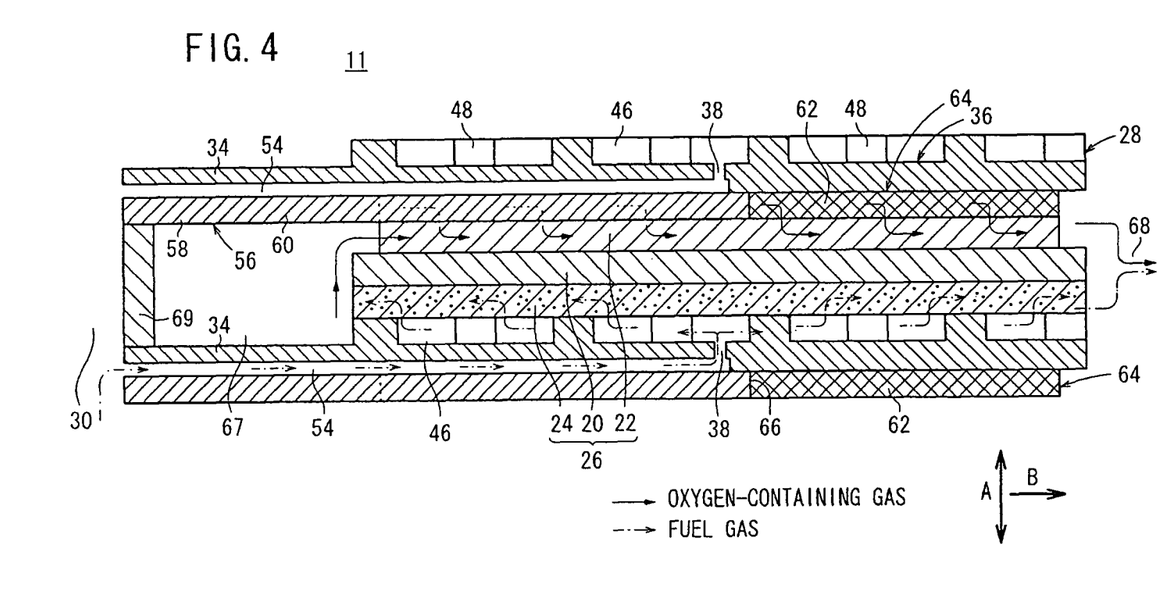
FIG. 4 is a cross sectional view schematically showing operation of the fuel cell.

As shown in FIGS. 2 and 4, a deformable elastic channel member such as an electrically conductive mesh member 64 is provided on the surface 36b of the sandwiching section 36. The mesh member 64 forms an oxygen-containing gas channel 62 for supplying the oxygen-containing gas along an electrode surface of the cathode 22. The mesh member 64 tightly contacts the cathode 22. For example, the mesh member 64 is made of wire rod material of stainless steel (SUS material), and has a substantially circular disk shape. The thickness of the mesh member 64 is determined such that the mesh member 64 can be elastically deformed desirably when a load in the stacking direction indicated by the arrow A is applied to the mesh member 64. The mesh member 64 has a cutout 66 as a space for providing the second bridge 60 of the channel member 56.

As shown in FIG. 4, the outer diameters of the mesh member 64 and the cathode 22 are within an area where the protrusions 48 are provided on the surfaces 36a, i.e., within an area excluding the outer circumferential portion of the anode 24 exposed to the oxygen-containing gas of the exhaust gas which has flown around from the outer end of the cathode 22 to the anode 24.

The oxygen-containing gas channel 62 formed in the mesh member 64 is connected to the oxygen-containing gas supply channel 67. The oxygen-containing gas is supplied in the direction indicated by the arrow B through the space between the inner circumferential end of the electrolyte electrode assembly 26 and the inner circumferential end of the sandwiching section 36. The oxygen-containing gas supply channel 67 extends in the stacking direction, inside the respective sandwiching sections 36 between the first bridges 34.

Insulating seals 69 for sealing the fuel gas supply passage 30 are provided between the separators 28. For example, the insulating seals 69 are made of mica material, or ceramic material. An exhaust gas channel 68 of the fuel cells 11 is formed outside the sandwiching sections 36.

As shown in FIG. 1, the fuel cell stack 12 includes end plates 70a, 70b provided at opposite ends of the fuel cells 11 in the stacking direction. The end plate 70a has a substantially circular disk shape. A circular groove 74 is formed in the outer circumferential ridge of the end plate 70a. A columnar projection 76 protrudes from the center of the end plate 70a. A stepped hole 78 is formed at the center of the projection 76. A plurality of holes 80 are formed around the projection 76. The holes 80 are connected to the oxygen-containing gas supply channel 67.

The casing 18 includes a first case unit 86a containing the load applying mechanism 21 and a second case unit 86b containing the fuel cell stack 12. The end plate 70b and an insulating member are sandwiched between the first case unit 86a and the second case unit 86b. The insulating member is provided on the side of the second case unit 86b. The joint portion between the first case unit 86a and the second case unit 86b is tightened by screws 88 and nuts 90. The end plate 70b functions as a gas barrier for preventing entry of the hot exhaust gas or the hot air from the fluid unit 19 into the load applying mechanism 21.

An end of a ring shaped wall plate 92 is joined to the second case unit 86b, and a head plate 94 is fixed to the other end of the wall plate 92. The fluid unit 19 is provided symmetrically with respect to the central axis of the fuel cell stack 12. Specifically, the substantially cylindrical reformer 16 is provided coaxially inside the substantially ring shaped heat exchanger 14.

A wall plate 96 is fixed to the groove 74 around the end plate 70a to form a channel member 98. The heat exchanger 14 and the reformer 16 are directly connected to the channel member 98. A chamber 98a is formed in the channel member 98, and is temporarily filled with the air heated at the heat exchanger 14. The holes 80 are openings for supplying the air, with which the chamber 98a is temporarily filled, to the fuel cell stack 12.

A fuel gas supply pipe 100 and a reformed gas supply pipe 102 are connected to the reformer 16. The fuel gas supply pipe 100 extends to the outside through the head plate 94. The reformed gas supply pipe 102 is inserted into the stepped hole 78 of the end plate 70a, and connected to the fuel gas supply passage 30.

An air supply pipe 104 and an exhaust gas pipe 106 are connected to the head plate 94. A channel 108 extending from the air supply pipe 104, and directly opened to the channel member 98 through the heat exchanger 14, and a channel 110 extending from the exhaust gas channel 68 of the fuel cell stack 12 to the exhaust gas pipe 106 through the heat exchanger 14 are provided in the casing 18.

The load applying mechanism 21 includes a first tightening unit 112a for applying a first tightening load T1 to a region around (near) the fuel gas supply passage 30 and a second tightening unit 112b for applying a second tightening load T2 to the electrolyte electrode assemblies 26. The second tightening load T2 is smaller than the first tightening load T1 (T1>T2).

A heating mechanism such as an electric heater (torch heater) 114 for heating the air as the oxygen-containing gas is provided in the first case unit 86a. At least one heating medium supply channel 116 is connected to the electric heater 114. The heating medium supply channel 116 is connected to the oxygen-containing gas supply channel 67, for supplying the hot air to the oxygen-containing gas supply channel 67. A switching valve 118 is provided in the middle of the heating medium supply channel 116.

Next, operation of the fuel cell system 10 and the method of starting operation according to the first embodiment will be described below.

At the time of starting operating the fuel cell system 10, firstly, the electric heater 114 is turned on before starting the supply of the oxygen-containing gas and the fuel gas to the fuel cell stack 12. The air is supplied to the electric heater 114, and electricity is supplied to the electric heater 114 for heating the air to a high temperature (500° C. to 800° C.) immediately.

Figure 5:
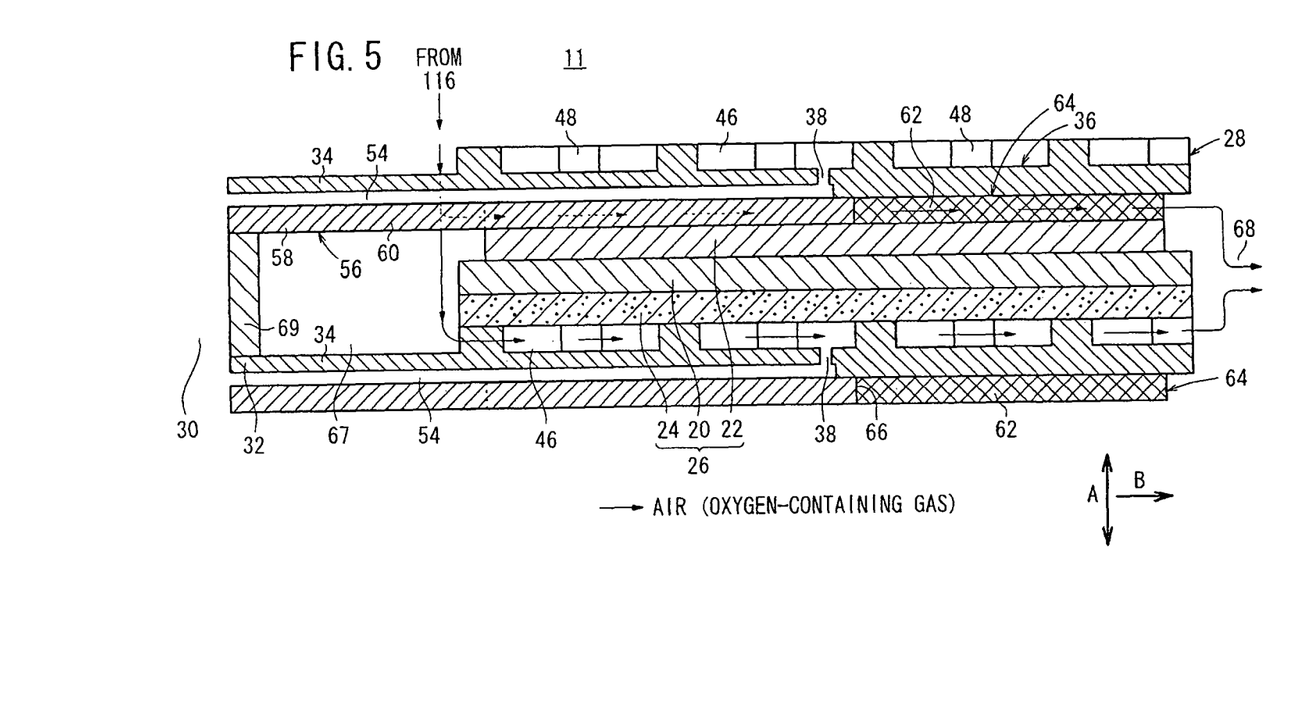
FIG. 5 is a cross sectional view schematically showing a manner of starting operation of the fuel cell.

By opening the switching valve 118, the hot heated air is supplied to the oxygen-containing gas supply channel 67 through the heating medium supply channel 116. Thus, as shown in FIG. 5, the air supplied to the oxygen-containing gas supply channel 67 flows into the space between the inner circumferential end of the electrolyte electrode assembly 26 and the inner circumferential end of the sandwiching section 36 in the direction indicated by the arrow B, and flows toward the oxygen-containing gas channel 62 formed by the mesh member 64.

Seal-less structure is adopted, i.e., no seal member is provided between the oxygen-containing gas supply channel 67 and the fuel gas channel 46. Therefore, in the state where no fuel gas is supplied to the fuel gas channel 46, by the supply pressure of the air flowing through the oxygen-containing gas supply channel 67, the air flows into the fuel gas channel 46 through the inner circumferential end of the electrolyte electrode assembly 26. The air flows in the direction indicated by the arrow B, same as the air flowing in the oxygen-containing gas channel 62.

In the first embodiment, the air heated to the high temperature (500° C. to 800° C.) by the electric heater 114 flows along the oxygen-containing gas channel 62 and the fuel gas channel 46 through the inner circumferential end of the electrolyte electrode assembly 26. Thus, since the cathode 22 and the anode 24 of the electrolyte electrode assembly 26 are heated by the hot air on the separator 28, the cathode 22 and the anode 24 are heated uniformly, and generation of the heat stress and heat strain is suppressed.

Then, as shown in FIG. 1, a fuel (methane, ethane, propane, or the like) and, as necessary, water are supplied from the fuel gas supply pipe 100. The fuel gas passes through the reformer 16 to be reformed, to thereby produce a fuel gas (hydrogen-containing gas). The fuel gas is supplied to the fuel gas supply passage 30 of the fuel cell stack 12. The fuel gas moves in the stacking direction indicated by the arrow A, and flows into the fuel gas supply channel 54 in the separator 28 of each fuel cell 11 (see FIG. 4).

The fuel gas flows along the fuel gas supply channel 54 between the first and second bridges 34, 60, and flows into the fuel gas inlets 38 of the sandwiching sections 36. Thus, the fuel gas is supplied to the fuel gas channel 46 on each of the sandwiching sections 36. The fuel gas inlets 38 are formed at positions corresponding to substantially the central positions of the anodes 24 of the electrolyte electrode assemblies 26. Thus, the fuel gas is supplied from the fuel gas inlets 38 to substantially the central regions of the anodes 24, and flows outwardly from the central regions of the anodes 24 along the fuel gas channel 46 on each of the sandwiching sections 36.

As described above, since the hot air is supplied to the fuel gas channel 46, spontaneous combustion (ignition) of the fuel gas supplied to the fuel gas channel 46 occurs to generate a heat source for directly heating the cathode 22 and the anode 24 on each separator 28. As a result, the electrolyte electrode assemblies 26 and the separators 28 are rapidly heated to the temperature where power generation can be performed. Accordingly, operation of the fuel cell stack 12 can be started suitably.

Further, in the fuel gas channel 46, complete combustion of the fuel gas occurs in the hot oxygen-containing gas atmosphere. Therefore, production of CO is prevented. No CO removing apparatus is required, economically. Further, since the heated oxygen-containing gas is used, for example, the combustion exhaust gas from a combustor (not shown) is not required. Accordingly, corrosion of the separators 28 is prevented suitably.

Further, the sandwiching sections 36 are arranged concentrically around the manifold 32, and the sandwiching sections 36 of the fuel cell stack 12 in the stacking direction are arranged in the same phase (in alignment with each other). Thus, by inducing ignition from the fuel gas channels 46 on the sandwiching sections 36 as heat sources, the entire fuel cell stack 12 can be heated at the same time. Accordingly, generation of the heat stress and heat strain due to the rapid raise in the temperature is suppressed, and improvement in the durability is achieved.

Further, in the fuel cell stack 12, the oxygen-containing gas supply channel 67 extending in the stacking direction is provided for supplying the oxygen-containing gas from the oxygen-containing gas supply channel 67 to the oxygen-containing gas channel 62. The heating medium supply channel 116 is connected to the oxygen-containing gas supply channel 67. In the structure, the hot oxygen-containing gas is sent from the heating medium supply channel 116 to the oxygen-containing gas supply channel 67, and thus, the cathode 22 and the anode 24 are directly heated on the separator 28. With the simple structure, the temperature of the fuel cell stack 12 is rapidly heated to the temperature where power generation can be performed, and operation of the fuel cell stack 12 can be started suitably.

Further, as the heating mechanism, for example, the electric heater 114 is provided. Therefore, it is possible to rapidly heat the oxygen-containing gas to a desired temperature, and operation of the fuel cell stack 12 can be started suitably. Unlike the case of heating using the combustion exhaust gas, it is possible to effectively prevent degradation of the electrolyte electrode assembly 26.

Next, operation of the fuel cell system 10 will be described.

In the fuel cell system 10, as shown in FIG. 1, a fuel and, as necessary, water are supplied from the fuel gas supply pipe 100, and the air is supplied from the air supply pipe 104. As described above, the fuel is reformed to produce the fuel gas, and the fuel gas flows into the fuel gas channel 46. As shown in FIG. 4, the fuel gas is supplied to the anode 24, and flows outwardly along the fuel gas channel 46.

As shown in FIG. 1, the air from the air supply pipe 104 flows through the channel 108 of the heat exchanger 14, and temporarily flows into the chamber 98a. The air flows through the holes 80 connected to the chamber 98a, and is supplied to the oxygen-containing gas supply channel 67 provided at substantially the center of the fuel cells 11. At this time, in the heat exchanger 14, as described later, since the exhaust gas discharged to the exhaust gas channel 68 flows through the channel 110, heat exchange between the air before supplied to the fuel cells 11 and the exhaust gas is performed. Therefore, the air is heated to a desired fuel cell operating temperature beforehand.

The air supplied to the oxygen-containing gas supply channel 67 flows into the space between the inner circumferential end of the electrolyte electrode assembly 26 and the inner circumferential end of the sandwiching section 36 in the direction indicated by the arrow B, and flows toward the oxygen-containing gas channel 62 formed by the mesh member 64. As shown in FIG. 4, in the oxygen-containing gas channel 62, the air flows from the inner circumferential end (central region of the separator 28) to the outer circumferential end (outer region of the separator 28) of, i.e., from one end to the other end of the outer circumferential region of the cathode 22 of the electrolyte electrode assembly 26.

Thus, in the electrolyte electrode assembly 26, the fuel gas flows from the central region to the outer circumferential region of the anode 24, and the air (oxygen-containing gas) flows in one direction indicted by the arrow B along the electrode surface of the cathode 22. At this time, oxygen ions move through the electrolyte 20 toward the anode 24 for generating electricity by electrochemical reactions.

The exhaust gas discharged to the outside of the respective electrolyte electrode assemblies 26 flows through the exhaust gas channel 68 in the stacking direction. When the exhaust gas flows through the channel 110 of the heat exchanger 14, heat exchange between the exhaust gas and the air is carried out. Then, the exhaust gas is discharged from the exhaust gas pipe 106.

Figure 6:
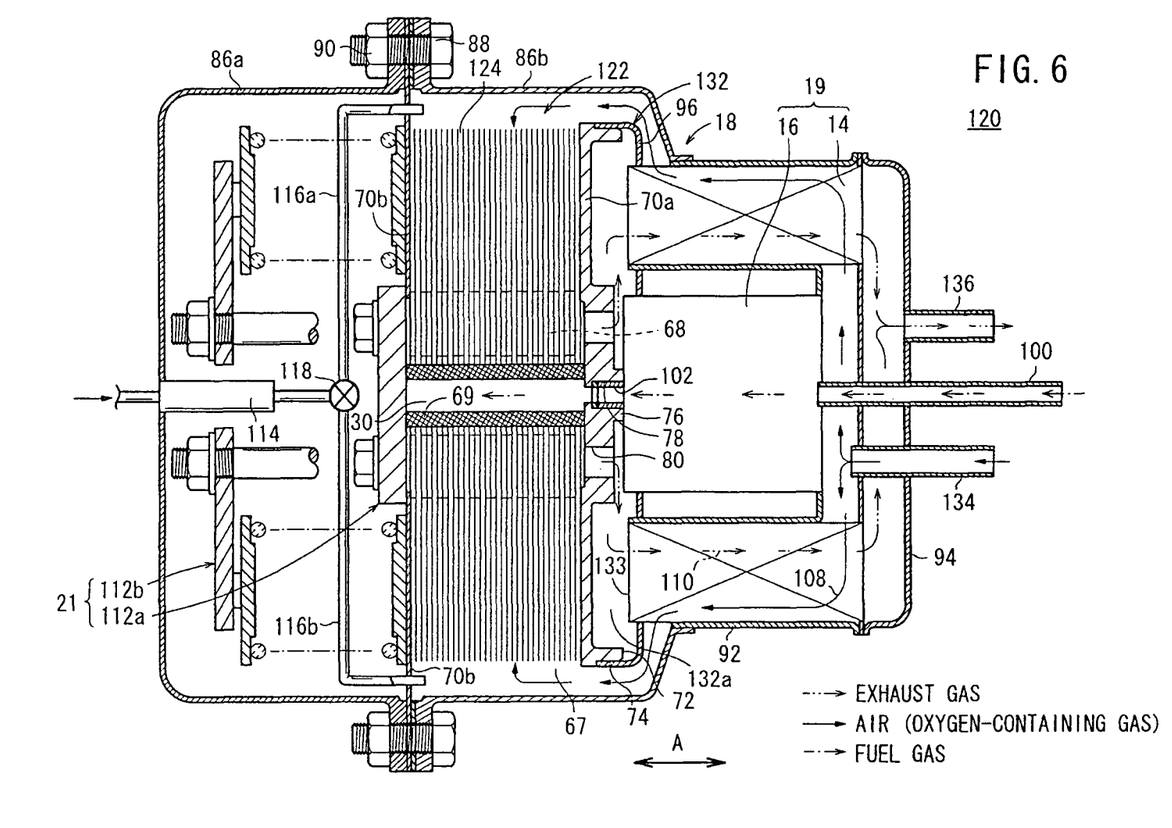
FIG. 6 is a partial cross sectional view showing a fuel cell system including fuel cells according to a second embodiment of the present invention.

FIG. 6 is a partial cross sectional view showing a fuel cell system 120 including fuel cells according to a second embodiment of the present invention. The constituent elements that are identical to those of the fuel cell system 10 according to the first embodiment are labeled with the same reference numeral, and description thereof will be omitted.

The fuel cell system 120 includes a fuel cell stack 122 provided in the casing 18. The fuel cell stack 122 is formed by stacking a plurality of fuel cells 124 in the direction indicated by the arrow A. The fuel cell stack 122 is sandwiched between the end plates 70a, 70b.

Figure 7:
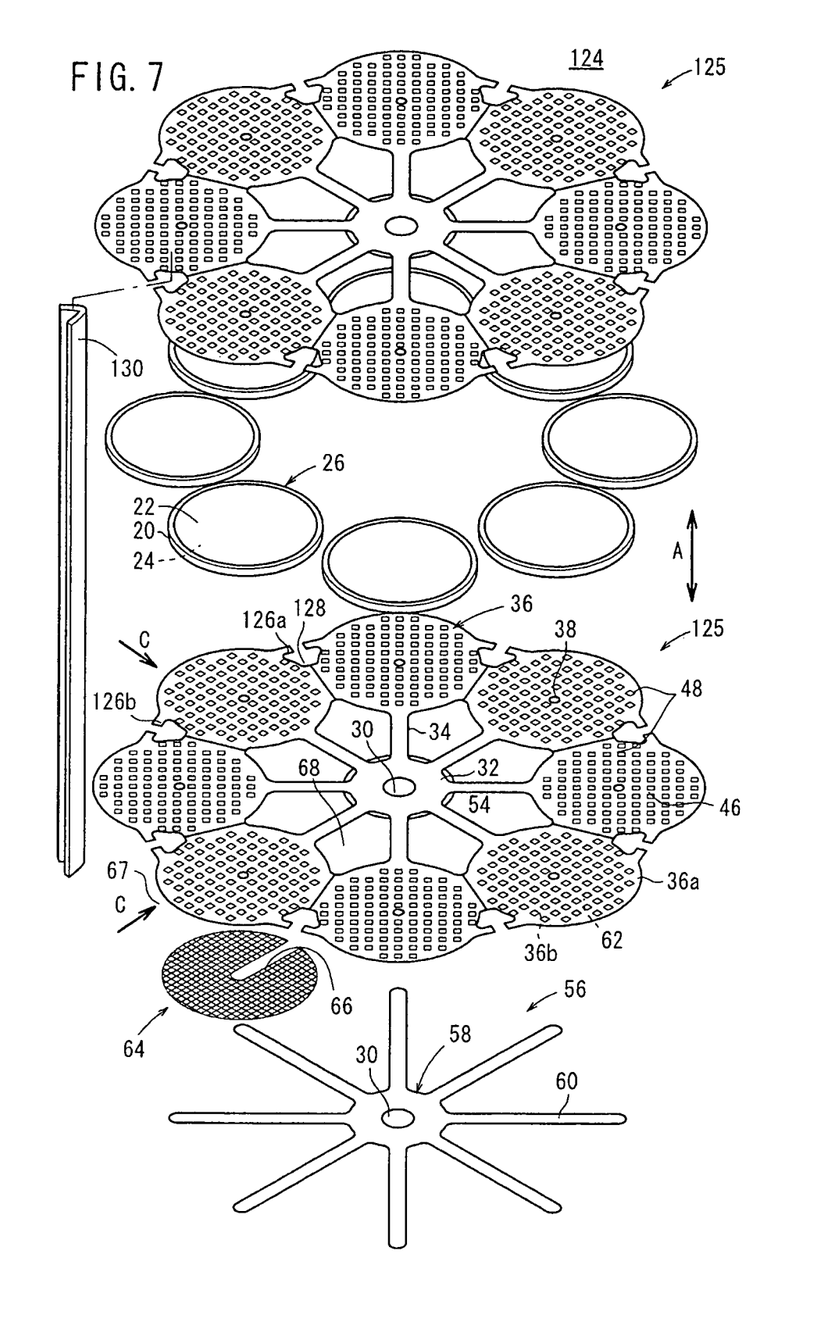
FIG. 7 is an exploded perspective view showing a fuel cell of the fuel cell system.
Figure 8:
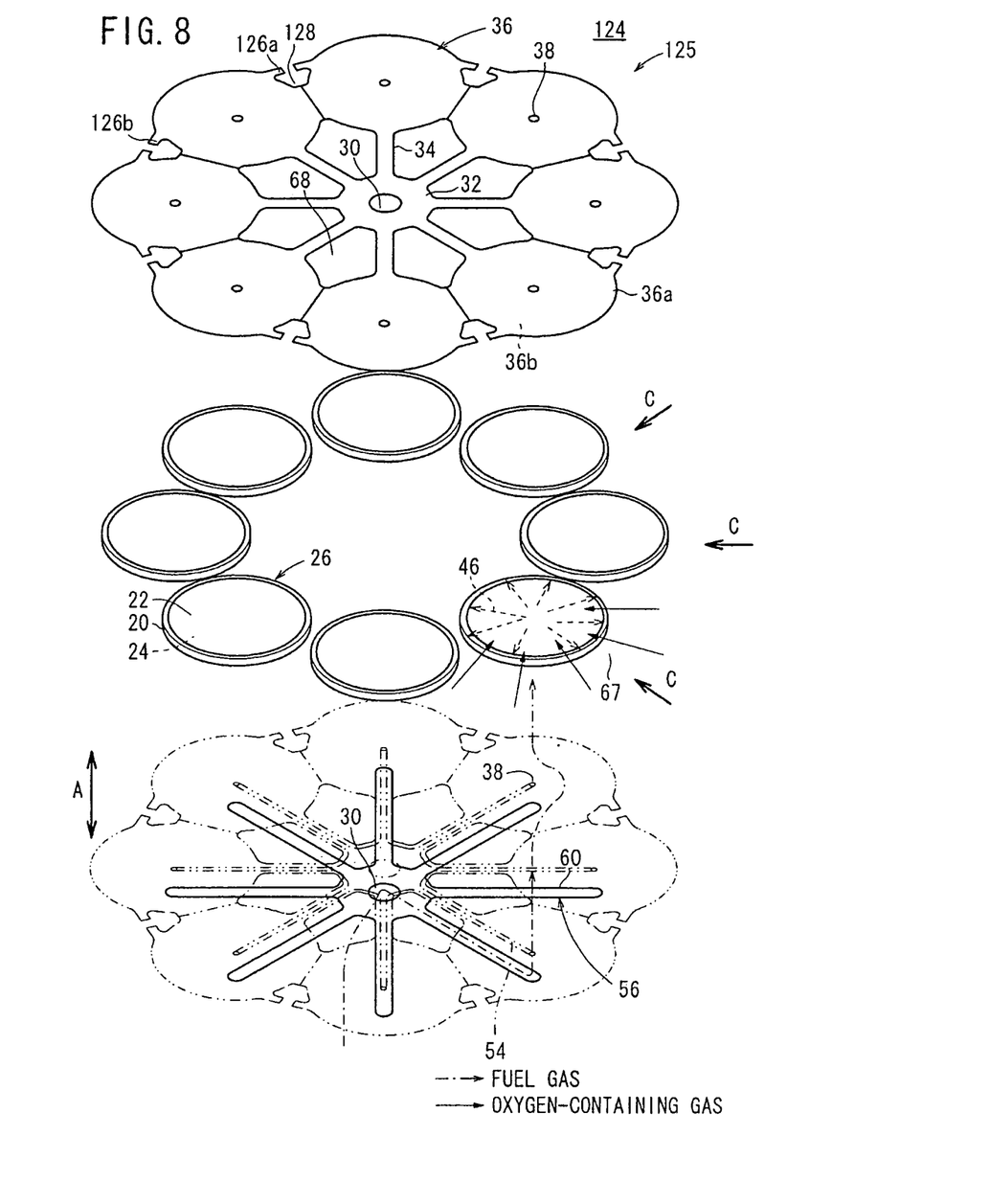
FIG. 8 is a partial exploded perspective view showing gas flows in the fuel cell.

As shown in FIGS. 7 and 8, in the fuel cell 124, the oxygen-containing gas flows along the cathode 22 of the electrolyte electrode assembly 26 in the direction indicated by an arrow C from the outer circumferential end to the inner circumferential end of the cathode 22, i.e., in the direction opposite to the flow direction in the case of the first embodiment.

In the separators 125 of the fuel cell 124, an oxygen-containing gas supply channel 67 is provided outside the sandwiching sections 36. An exhaust gas channel 68 is formed by spaces between the first bridges 34 inside the sandwiching sections 36. The exhaust gas channel 68 extends in the stacking direction. Each of the sandwiching sections 36 includes extensions 126a, 126b protruding toward the adjacent sandwiching sections 36 on both sides, respectively. Spaces 128 are formed between the adjacent extensions 126a, 126b, and baffle plates 130 extend through the respective spaces 128 in the stacking direction.

Figure 9:
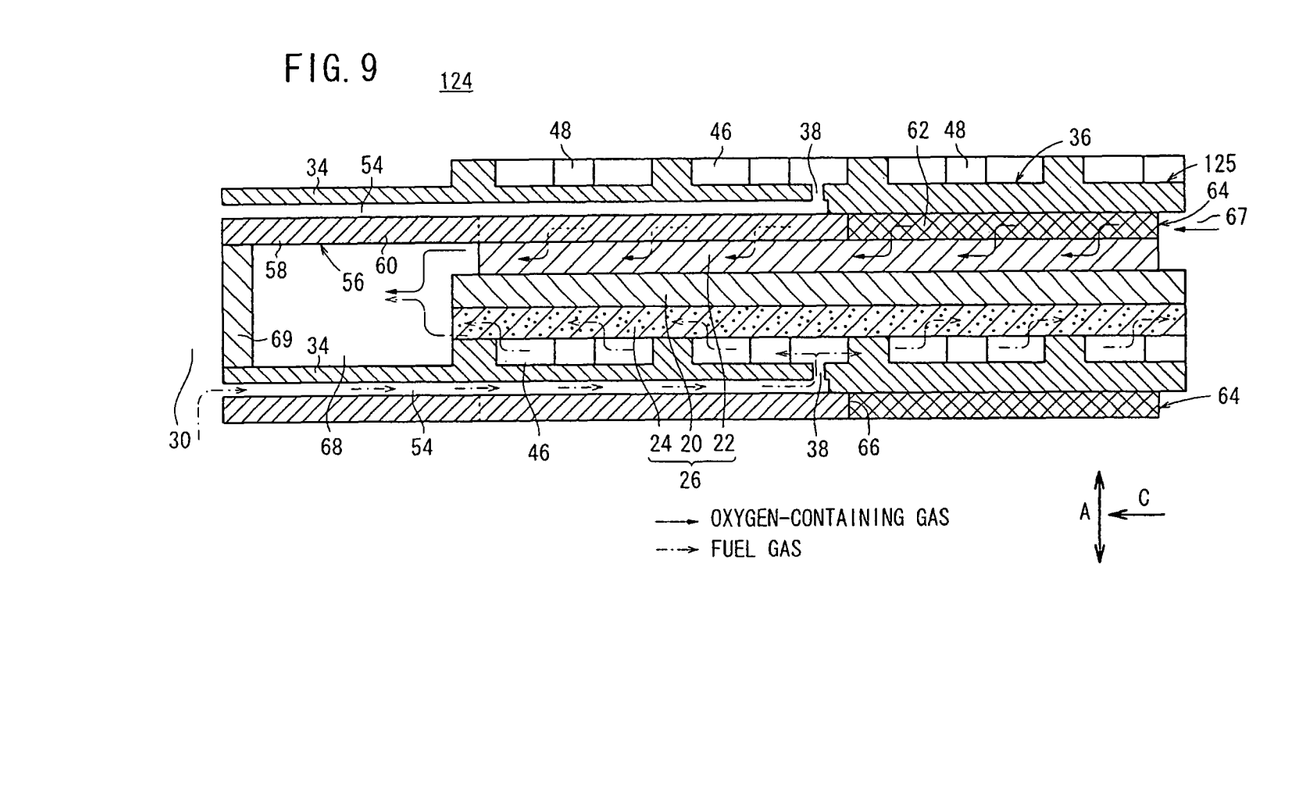
FIG. 9 is a cross sectional view schematically showing operation of the fuel cell.

As shown in FIG. 9, the oxygen-containing gas channel 62 is connected to the oxygen-containing gas supply channel 67 for supplying the oxygen-containing gas from the space between the outer circumferential end of the sandwiching section 36 and the outer circumferential end of the electrolyte electrode assembly 26 in the direction indicated by the arrow C. The oxygen-containing gas supply channel 67 is formed around the outer ends of the sandwiching sections 36 (see FIG. 7).

As shown in FIG. 6, a channel member 132 forming a chamber 132a which is connected to the exhaust gas channel 68 through the holes 80 is formed at the end plate 70a. The chamber 132a is temporarily filled with the exhaust gas discharged from the fuel cells 124. The exhaust gas flows through the channel 110 in the heat exchanger 14 via an opening 133 opened directly to the chamber 132a.

An air supply pipe 134 and an exhaust gas pipe 136 are connected to the head plate 94. The air supply pipe 134 extends up to a position near the reformer 16. An end of the exhaust gas pipe 136 is connected to the head plate 94.

The electric heater 114 is connected to one or more heating medium supply channels 116a, 116b through the switching valve 118. The heating medium supply channel 116a extends through the end plate 70b, and the heating medium supply channel 116a is connected to the oxygen-containing gas supply channel 67 outside the outer circumferential portion of the sandwiching sections 36.

Figure 10:
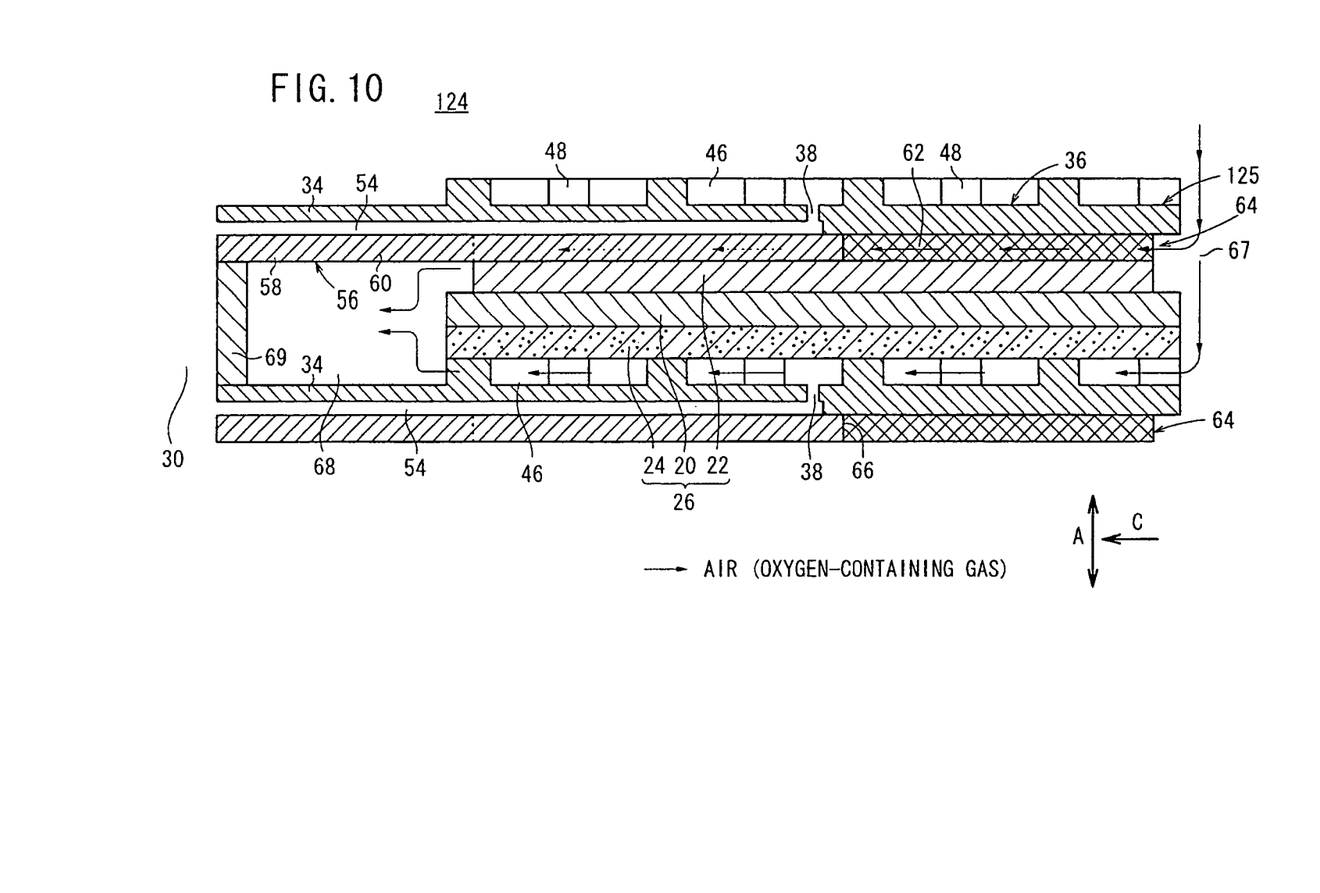
FIG. 10 is a cross sectional view schematically showing a manner of starting operation of the fuel cell.

In the second embodiment, at the time of starting operation of the fuel cell system 120, the electric heater 114 is operated to heat the air. When the switching valve 118 is opened, the heated air flows through the heating medium supply channels 116a, 116b, and is supplied to the oxygen-containing gas supply channel 67. Thus, as shown in FIG. 10, the air flows from the spaces between the outer circumferential end of the electrolyte electrode assembly 26 and the outer circumferential end of the sandwiching section 36 in the direction indicated by the arrow C, and the air is supplied to the oxygen-containing gas channel 62 formed by the mesh member 64.

No seal member is provided between the oxygen-containing gas supply channel 67 and the fuel gas channel 46. Therefore, in the state where no fuel gas is supplied to the fuel gas channel 46, by the supply pressure of the air flowing through the oxygen-containing gas supply channel 67, the air flows into the fuel gas channel 46 through the outer circumferential end of the electrolyte electrode assembly 26. The air flows in the direction indicated by the arrow C, as with the air flowing in the oxygen-containing gas channel 62.

In the second embodiment, the air heated to the high temperature by the electric heater 114 flows along the oxygen-containing gas channel 62 and the fuel gas channel 46 through the outer circumferential end of the electrolyte electrode assembly 26, and thereafter, the fuel gas is supplied to the fuel gas channel 46, thereby to cause ignition of the fuel gas.

Thus, the same advantages as in the case of the first embodiment are obtained. For example, the cathode 22 and the anode 24 are heated uniformly, the electrolyte electrode assembly 26 and the separator 28 are rapidly heated to the temperature where power generation can be performed. Accordingly, operation of the fuel cell stack 12 can be started suitably.

Next, operation of the fuel cell system 120 will be described. As shown in FIG. 6, firstly, the fuel gas flows from the fuel gas supply pipe 100 to the fuel gas supply passage 30 through the reformer 16. The air as the oxygen-containing gas flows from the air supply pipe 134 through the channel 108 of the heat exchanger 14, and is supplied to the oxygen-containing gas supply channel 67 outside the fuel cells 124.

As shown in FIG. 9, the air flows in from the space between the outer circumferential end of the electrolyte electrode assembly 26 and the outer circumferential end of the sandwiching section 36 in the direction indicated by the arrow C, and the air is supplied to the oxygen-containing gas channel 62 formed by the mesh member 64. Thus, power generation is performed in each of the electrolyte electrode assemblies 26. The exhaust gas as the mixture of the fuel gas and the air after consumption in the reactions of the power generation flows in the stacking direction through the exhaust gas channel 68 in the separators 125.

The exhaust gas flows through the holes 80, and the chamber 132a in the channel member 132 formed at the end plate 70a is temporarily filled with the exhaust gas (see FIG. 6). Further, when the exhaust gas flows through the channel 110 of the heat exchanger 14, heat exchange is performed between the exhaust gas and the air. Then, the exhaust gas is discharged from the exhaust gas pipe 136.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system comprising a fuel cell stack formed by stacking electrolyte electrode assemblies and separators in a stacking direction, the electrolyte electrode assembly including an anode, and a cathode, and an electrolyte interposed between the anode and the cathode, the separator comprising:
a sandwiching section for sandwiching the electrolyte electrode assembly, the sandwiching section having a fuel gas channel for supplying a fuel gas along an electrode surface of the anode and an oxygen-containing gas channel for supplying an oxygen-containing gas along an electrode surface of the cathode, and allowing the fuel gas and the oxygen-containing gas after consumption to be discharged from a circumferential portion of the electrolyte electrode assembly;
a bridge connected to the sandwiching section, a fuel gas supply channel being formed in the bridge for supplying the fuel gas to the fuel gas channel; and
a manifold connected to the bridge, a fuel gas supply passage extending through the manifold in the stacking direction for supplying the fuel gas to the fuel gas supply channel, the fuel cell system further comprising:
- an electric heater for heating the oxygen-containing gas supplied to the fuel cell stack in fluid communication with a heating medium supply channel; and wherein the heating medium supply channel for distributing the heated oxygen-containing gas is in fluid communication with the oxygen-containing gas channel and the fuel gas channel through the circumferential portion of the electrolyte electrode assembly; and
- an oxygen-containing gas supply channel extending in the stacking direction, for supplying the oxygen-containing gas to the oxygen-containing gas channel, wherein the heating medium supply channel is connected to the oxygen-containing gas supply channel.

2. A fuel cell system according to claim 1, wherein a plurality of the sandwiching sections are provided concentrically around the manifold, and a plurality of the sandwiching sections arranged in the stacking direction of the fuel cell stack are in alignment with each other.

3. A method of starting operation of the fuel cell system comprising a fuel cell stack formed by stacking electrolyte electrode assemblies and separators in a stacking direction, the electrolyte electrode assembly including an anode, and a cathode, and an electrolyte interposed between the anode and the cathode, the separator comprising:
- a sandwiching section for sandwiching the electrolyte electrode assembly, the sandwiching section having a fuel gas channel for supplying a fuel gas along an electrode surface of the anode and an oxygen-containing gas channel for supplying an oxygen-containing gas along an electrode surface of the cathode, and allowing the fuel gas and the oxygen-containing gas after consumption to be discharged from a circumferential portion of the electrolyte electrode assembly;
- a bridge connected to the sandwiching section, a fuel gas supply channel being formed in the bridge for supplying the fuel gas to the fuel gas channel;
- a manifold connected to the bridge, a fuel gas supply passage extending through the manifold in the stacking direction for supplying the fuel gas to the fuel gas supply channel; and
- an oxygen-containing gas supply channel extending in the stacking direction for supplying the oxygen-containing gas to the oxygen-containing gas channel, the method comprising the steps of:
- heating the oxygen-containing gas with an electric heater;
- distributing the heated oxygen-containing gas to the oxygen-containing gas channel and the fuel gas channel through the circumferential portion of the electrolyte electrode assembly; and
- causing ignition of the fuel gas by supplying the fuel gas to the fuel gas channel.

4. A method of starting operation of the fuel cell system according to claim 3, wherein a plurality of the sandwiching sections are provided concentrically around the manifold, a plurality of the sandwiching sections arranged in the stacking direction of the fuel cell stack are in alignment with each other, and the fuel cell stack is heated by ignition of the fuel gas in each of the fuel gas channels of the sandwiching sections.

* * * * *